INVENTOR
RAYMOND W. JENSEN
BY
ATTORNEY

Dec. 27, 1960   R. W. JENSEN   2,966,308
CABIN TEMPERATURE SYSTEM
Filed Jan. 31, 1955   2 Sheets-Sheet 2
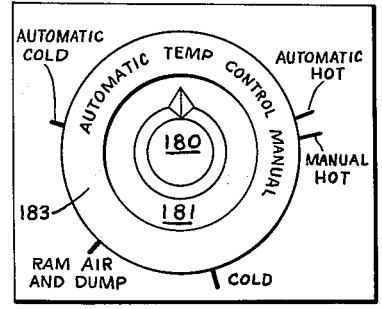
Fig. 2.
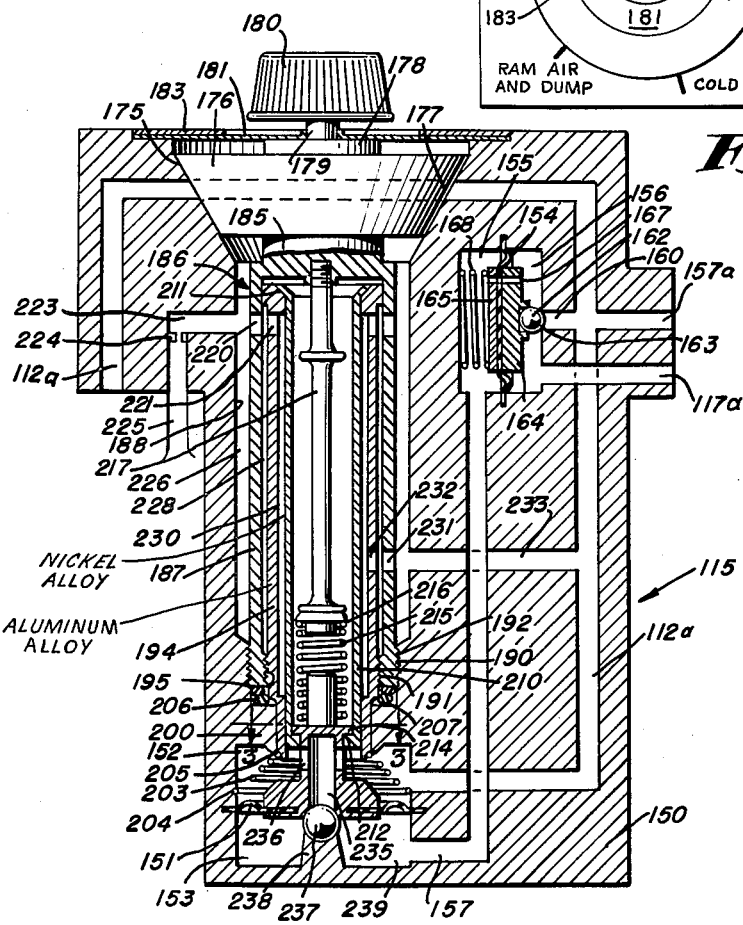
Fig. 4.
Fig. 3.
RAYMOND W. JENSEN
INVENTOR
BY
ATTORNEY

United States Patent Office 2,966,308
Patented Dec. 27, 1960

2,966,308
CABIN TEMPERATURE SYSTEM

Raymond W. Jensen, Encino, Calif., assignor to The Garrett Corporation, Los Angeles, Calif., a corporation of California Filed Jan. 31, 1955, Ser. No. 484,972

11 Claims. (Cl. 236—82)

This invention relates generally to fluid conditioning systems and relates more particularly to air conditioning and temperature control apparatus for enclosures.

While the invention has particular utility in connection with air conditioning apparatus for enclosures such as, for example, aircraft cabins, or other such enclosures, and is disclosed herein as embodied in such apparatus, it is to be understood that its utility is not confined thereto.

Under certain operating conditions, it is highly desirable, and more or less essential, that the cabins or cockpits of aircraft be supplied with properly conditioned air. For example, as a general rule cooling or refrigeration is required only from sea level up to an altitude of approximately 15,000 feet above sea level, such a conditioning of the air being especially desirable when the aircraft is flying in tropical conditions of relatively high temperatures and humidity. Various systems have been proposed for carrying out the air refrigerating and circulating process. In the case of a turbine-powered aircraft, compressed air is bled off from the main compressor for cabin ventilation and/or pressurization purposes. In the case of a reciprocating-engine-powered aircraft, an auxiliary cabin supercharger is driven by the engine and furnishes such cabin air. In either case, the air is relatively hot and compressed to a pressure somewhat above that necessary for the purpose, and in such cases it is common to provide means for cooling or refrigerating the air and reducing its pressure to a useful level. The present invention is largely concerned with aircraft in which a suitable source of compressed air is available, the air being delivered through a duct for cabin or cockpit ventilation and/or pressurization purposes.

It is an object of the invention to provide a system or apparatus which will meet various operating conditions to provide proper temperature and pressure conditions within the enclosure.

Another object of the invention is to provide apparatus of this character wherein a sample of the cabin air is sensed for providing the proper control.

Still another object of the invention is to provide apparatus of this character wherein the temperature setting will rise with increasing altitude.

A further object of the invention is to provide apparatus of this character which provides an automatic control of the conditions desired within the enclosure.

A still further object of the invention is to provide apparatus of this character having a manual control.

Still another object of the invention is to provide apparatus of this character which may be quickly and easily set or adjusted for the conditions desired.

A further object of the invention is to provide apparatus of this character that is compact and sturdy.

A still further object of the invention is to provide apparatus of this character that is effective and reliable in operation.

The characteristics and advantages of the invention are further sufficiently referred to in connection with the following detailed description of the accompanying drawings which represent one embodiment. After considering this example, skilled persons will understand that many variations may be made without departing from the principles disclosed and I contemplate the employment of any structures, arrangements, or modes of operation that are properly within the scope of the appended claims.

Referring to the drawings:

Fig. 2 is a schematic sectional view of the control device;

Fig. 3 is a sectional view taken on line 3—3 of Fig. 2; and

Fig. 4 is a view showing the dial face of the control device.

Figure 1:
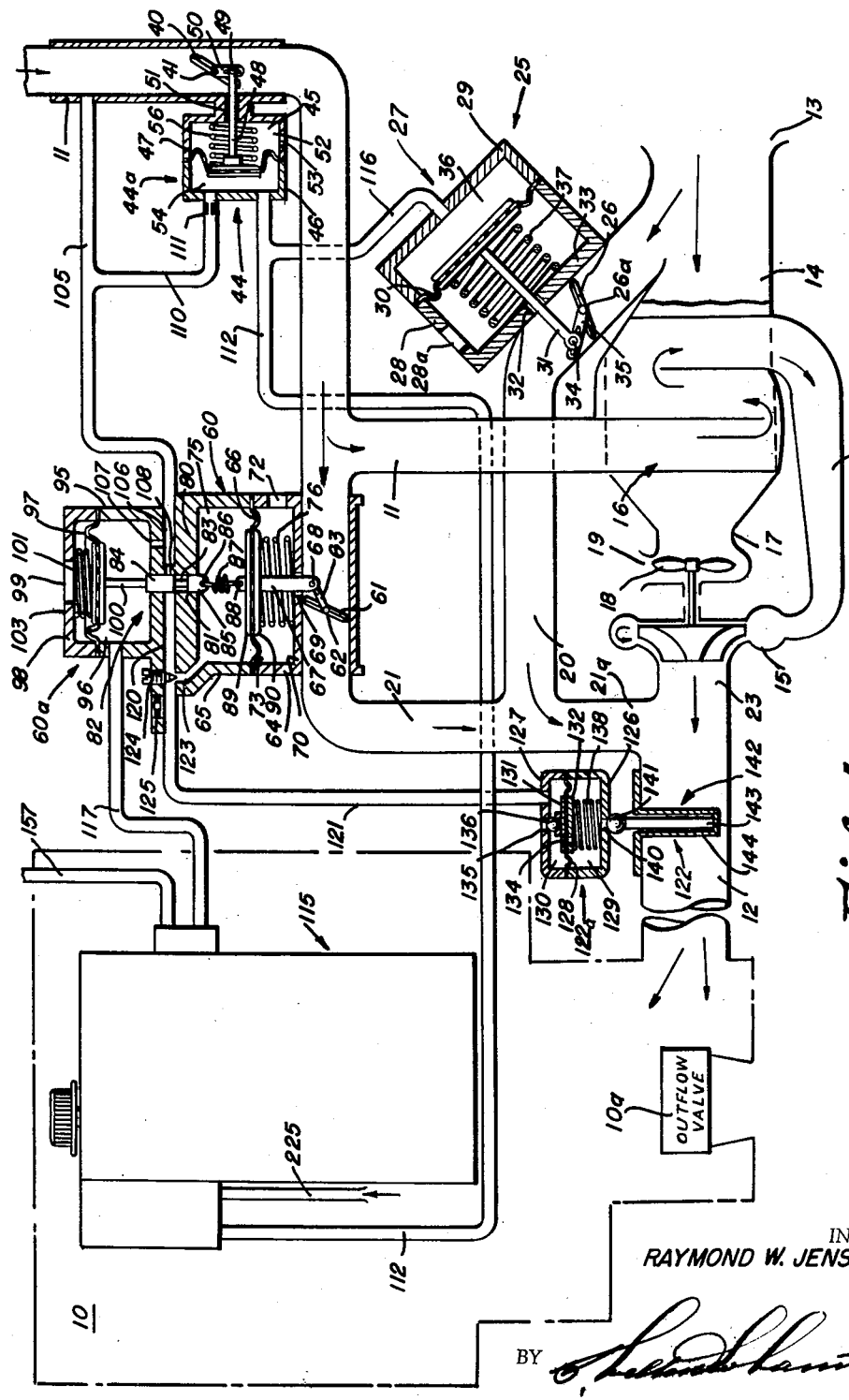
Fig. 1 is a schematic view of the system showing the apparatus embodying the present invention.

Referring more particularly to the drawings, there is shown an aircraft cabin, indicated generally at 10, such cabin being supplied with air at a suitable predetermined temperature and pressure to provide refrigeration and circulation or ventilation, the escape of air from said cabin being controlled by an outflow valve 10a of any well known type.

In the case of turbine-powered aircraft, compressed air is bled off from the main compressor for cabin ventilation and/or for pressurization purposes. In the case of aircraft powered by reciprocating engines, an auxiliary supercharger may be provided, said supercharger being driven by the engine or one of the engines in the case of an aircraft having a plurality of engines. In either case, the air is relatively hot and compressed to a pressure somewhat above that suitable for the purpose. This air at relatively high pressure and temperature is delivered to conduit 11 which is connected to a main duct 12 delivering air to the cabin.

In view of the fact that the air thus delivered by way of conduit 11 is of a temperature higher than required, there is means provided for cooling or refrigerating the air and reducing its temperature and pressure to a useful level. High pressure air from the conduit 11 is carried to an intercooler 16. From the intercooler this air passes to a cooling turbine 15 by way of a passage 22, and is discharged from the turbine into conduit 23 which leads into conduit 12, thus the heated air from conduit 11 is cooled by the intercooler and the turbine. There is a hot air bypass 21 around the intercooler and turbine.

A supply of cooling air is derived from a ram 13 connected to a conduit 14 which is connected to the intercooler. There is a connection 17, with a fan 18 which is driven by the turbine 15 and it aids in drawing ram air through the intercooler for cooling the heated air which passes therethrough. Air is discharged from the fan by way of a discharge conduit 19 leading to any suitable region for disposal of the discharge air. There is also a ram air bypass conduit 20 connecting the conduit 14 with the bypass 21 whereby the relatively cold low pressure ram air may bypass the turbine and intercooler. Bypass 20 and bypass 21 have a common portion 21a which leads to the conduit 12.

Various controls are provided in the system and include a ram air valve mechanism, indicated generally at 25, and including a butterfly valve 26 mounted on a valve shaft 26a, said valve 26 being disposed in the bypass 20. A pressure responsive valve actuating device, indicated generally at 27, is provided for controlling the valve 26. The control device 27 comprises a casing 28 and a cap 29, there being a flexible diaphragm 30 marginally clamped between said casing 28 and cap 29. The diaphragm 30 is connected to the valve 26 by means of an actuating rod 31 which passes through an opening 32 provided therefor in the bottom wall 33 of the casing 28, said rod having a pin and slot connection 34 with a valve arm 35 which is operably connected to said valve 26. A spring 37 is located within the casing 28 and reacts between the bottom wall 33 thereof and the diaphragm 30, for urging the diaphragm in a direction to effect opening of the valve 26, so that the device fails open, the chamber in which the spring 37 is located being vented to atmosphere at 28a to relieve any undesirable pressure therein which might interfere with the proper action of the device. The cap 29 and the diaphragm 30 define a pressure chamber 36, and pressure in said chamber urges the diaphragm in a direction urging the valve 26 in the valve closing direction.

The high pressure conduit 11 is also provided with bleed air shut-off valve means or mechanism, indicated generally at 44, for controlling the flow of fluid therethrough, said means including a butterfly valve 40 mounted on a valve shaft 41, said valve 40 being located in conduit 11 upstream of the junction of the conduit 21 and conduit 11. A pressure responsive device, indicated generally at 44a, controls the position of the valve 40. Device 44a includes a casing 45 and a cap 46, between which is marginally clamped a flexible diaphragm 47. A rod 48 has one end secured to the diaphragm 47 by any suitable well-known means, and has the opposite end operably secured at 49 by means of a pin and slot arrangement to the free end of a valve actuating lever 50, secured to shaft 41. The rod 48 is slidably disposed in an opening 51 in the bottom portion of the casing 45. It is to be noted that the rod is freely slidable in said opening 51, but the fit is sufficiently snug to prevent excessive leakage past said rod into the space or chamber 52 within the casing 45. A vent 53 in the casing wall prevents undesirable pressures within said casing such as might interfere with the proper operation of the device 44. The cap 46 and diaphragm 47 define a pressure chamber 54, and pressure in said chamber urges the diaphragm 47 in a direction tending to move the valve 40 in the opening direction. A spring 56 within the chamber 52 reacts between the bottom of casing 45 and said diaphragm 47, to urge the valve 40 in the closing direction, and should there be a failure of operating pressure in the system the valve 40 will fail closed.

The system further includes bypass valve means, indicated generally at 60, having a valve 61 within the conduit 21 between the junction of said conduit 21 with the conduit 11, and the junction of the conduit 21 and the conduit 20. The valve 61 is shown as a butterfly valve mounted on a valve shaft 62 carrying an actuating arm 63. The mechanism 60 comprises a casing 64 and a casing 65 between which is marginally clamped a flexible diaphragm 66. An operating connection is provided between the diaphragm 66 and the lever 63, said connection comprising a rod 67 having one end secured to the diaphragm by any suitable well-known means and having the other end operably connected to the free end of said lever 63 by means of a pin and slot connection 68, said rod being slidably received in an opening 69 provided in the bottom wall 70 of the casing 64. A vent opening 72 to atmosphere vents chamber 73 defined by casing 64, to relieve any undesirable pressure which might otherwise develop in said chamber 73 and which might interfere with the proper functioning of the mechanism. Casing 65 of the mechanism 60 defines with diaphragm 66 a pressure chamber 75, pressure in said chamber 75 urging the diaphragm 66 in a direction to effect opening of the valve 61. Within chamber 73 is a spring 76 which reacts between the bottom wall 70 and said diaphragm 66 to urge the latter in a direction to move the valve 61 closed.

There is a control device 60a for the bypass valve means 60, casing 65 having an end wall 80 of substantial thickness and said wall is provided with a bore 81 arranged substantially axially with a diaphragm 66. Bore 81 extends entirely through the wall 80 and is provided with a slidable metering valve member, indicated generally at 82. This valve member has a reduced diameter portion 83 thereby providing a part 84 and a part 85, the latter being provided with an opening 86 for reception of one end of a spring 87, the opposite end of such spring being secured to an ear 88 connected to a plate 89 secured to the diaphragm 66 by rivets or the like, not shown, connecting said plate 89 and a plate 90 to the opposite side of said diaphragm. The central portion of the diaphragm 66 is thereby clamped between said plates. Casing 65 has a hollow outer portion 95 which defines a chamber 96. A flexible diaphragm 97 is clamped between the free end of the casing portion 95 and a cap 98 which has a vent opening 99 for venting the interior thereof to atmosphere. Valve 82 has a stem 100 which is connected to the diaphragm 97 whereby movement of said diaphragm will be transferred to the valve 82 for controlling same. Pressure in chamber 96 urges the diaphragm 97 in one direction and a spring 101 within the cap 98 reacts between the bottom 103 of said cap and said diaphragm for urging said diaphragm in the opposite direction.

The operating pressure system for the various control mechanisms is derived from the high pressure conduit 11 upstream of the valve 40 although other suitable means for supplying pressure to the system may be used. As shown the operating pressure system includes a conduit 105 which is connected to conduit 11 upstream of the valve 40, said conduit 105 also being connected to a passage 106 in the wall 80. The passage 106 has a bleed connection 107 to the chamber 96 and a restricted connection 108 with the bore 81. A branch conduit 110 leads from the conduit 105 to the chamber 54 of the mechanism 44, there being a restriction 111 in said conduit 110. A conduit 112 leads from the chamber 54 to a controller mechanism, indicated generally at 115, the particular way in which the conduit 112 is connected to the control 115 being hereinafter more fully described. The branch conduit 116 leads from the conduit 112 to the chamber 36. The chamber 96 of the mechanism 60a is connected by a conduit 117 with said controller 115 and this connection with said controller will also be more fully described hereinafter.

Wall 80 of the mechanism 60 is provided with a passage 120, which is aligned with the passage 106, said passage 120 being connected by a conduit 121 with a high limit thermostatic device indicated generally at 122 and a pressure rate of change device 122a. There is a bleed connection 123 from the passage 120 to the chamber 75 and there is means for controlling the size of said bleed, said means comprising a needle valve 124. There is also a bleed orifice 125 of fixed size provided for the conduit 121.

The pressure rate of change device 122a comprises a pair of hollow casing members 126 and 127 between which is marginally clamped a flexible diaphragm 128 which separates the casing defined by said members 126 and 127 into a pair of chambers 129 and 130, the conduit 121 being connected with said chamber 130. A central region of the diaphragm 128 is provided with a pair of plates 131 and 132 on opposite sides of said diaphragm and secured together by any suitable wellknown means such as rivets or like, not shown. There is a bleed passage 134 through the diaphragm and plates which connects the chambers 129 and 130. Chamber 130 has an outlet 135 of fixed size leading to atmosphere, said outlet being controlled by a movable ball valve member 136 secured to the plate 131 so that said outlet 135 is controlled by the diaphragm 128. It is to be noted that pressure in the chamber 130 acts on the diaphragm 128 to urge said diaphragm in the valve opening direction.

A spring 138 is located in chamber 129 and is effective to urge the diaphragm 128 in the valve closing direction.

Chamber 129 is also provided with an atmospheric outlet 140 which is controlled by a ball valve 141 which in turn is controlled by a high limit temperature responsive device or thermostatic device 142. The thermostatic device 142 includes a bar 143 disposed within a casing 144 which extends into the conduit 12, bar 143 and casing 144 having different co-efficients of expansion and the bar 143 is separately connected to the ball valve 141 for directly actuating said ball.

The interior of the control mechanism 115 is shown in Fig. 2 and this mechanism comprises a body or housing 150 which is provided with cavities. One of these cavities is divided by a flexible diaphragm 151 to thereby define a pair of chambers 152 and 153 on opposite sides thereof, chamber 152 being an ambient pressure chamber and chamber 153 being a signal pressure chamber. The other cavity is divided by a diaphragm 154 to thereby separate said cavity into a pair of chambers 155 and 156 on opposite sides of said diaphragm 154. Conduit 112 is connected to a passage 112a in the body 150 and said passage 112a leads to the chamber 152. A passage 157 connects chamber 153 with chamber 155. Conduit 117 is connected to a passage 117a in the body 150 and said passage 117a leads to the chamber 156. A passage 160 leads from chamber 156 and is connected to a conduit 157a which leads to atmosphere. It is to be noted that passage 160 is also connected with passage 112a. A ball valve 162 controls a port 163 leading to the passage 160, said ball valve 162 being suitably attached to a plate 164. The plate 164 and a plate 165 are secured to a central region of the diaphragm 154 by any suitable means such as rivets or the like, not shown. The plates 164 and 165 are disposed on opposite sides of the diaphragm 154 and chambers 155 and 156 are connected together, through the diaphragm and said plates, by a means of a bleed passage 167. A spring 168 in the chamber 155 urges the diaphragm in a direction to effect closing of the port 163 by the ball valve member 162.

The body 150 is provided with an inwardly tapered recess 175 for reception of a tapered dump valve 176 which has a port 177. Dump valve 176 is provided with an axial boss 178 from which extends a stub shaft 179 to which a knob 180 is secured. There is an enlarged shallow recess in the end of the body 150 from which the recess 175 extends. A plate 181 is disposed in the bottom of the shallow recess and engages the boss 178 to maintain the dump valve 176 within the recess 175. A dial 183 is also disposed in the shallow recess on top of the plate 181. The dial face is indexed for various temperature settings and is provided with proper nomenclature. These marks are as follows: Ram Air and Dump—Automatic Cold—Automatic Hot—Manual Hot— Manual Cold.

The inner end of the dump valve is provided with an internally serrated bore for slidable reception of a splined end 185 of the differential screw, indicated generally at 186. The differential screw comprises a hollow or tubular sleeve 187 which is received in a bore 188 extending from the bottom of the tapered recess 175. Throughout the major portion of its length the bore 188 is of larger diameter than the diameter of the sleeve 187. The lower end of the sleeve or screw 187 is provided with external threads 190 and internal threads 191. These threads are left hand threads and are of different pitch, the external pitch, the external threads 190 being of low pitch while the internal threads 191 are of steeper pitch, the purpose of which will be hereinafter set forth. The external threads are screwed into internal threads 192 of a reduced diameter portion of the bore 188. Sleeve 187 houses a thermostat rod 194 which is provided with external threads 195 adjacent its lower end, said threads 195 being operably received in the internal threads 191 of the sleeve 187.

Means is provided to prevent rotation of the thermostat rod 194, said means comprising splines 200 in which serrations 201 of the rod are received. Thus, rotation of the differential screw 187 in either direction will effect axial movement of the rod 194. It is important to note that as screw 187 is rotated it will move longitudinally in the body 150. Since the thermostat rod 194 is held against rotation by splines 200 and 201, the reaction of the threads in the rod with the internal threads in the screw 187 will cause the rod 194 to move relative to the screw 187, but in the direction opposite to that of the screw. The difference in pitch between threads 191 and 192 further causes the rod 194 to move longitudinally relative to the body 150. A spring 203 has one end received in a groove 204, the opposite end of said spring engaging a shoulder 205 adjacent the lower end of said rod 194. Spring 203 exerts an axial force upon rod 194 to take up slack between threads 191 and 195 and prevent any inaccuracy which might result therefrom. Sealing rings 206 are provided at the lower end of the differential screw sleeve 187 and a shoulder 207 of the body 150. The seal means also engages the adjacent portion of the rod 194 to effect a seal therewith.

The thermostat rod 194 is tubular and comprises a portion of the core assembly. The core assembly further includes a core 210, said core and thermostat rod being swaged together at 211 adjacent the dump valve end. The thermostat rod 194 is formed of an aluminum alloy while the thermostat core 210 is of a nickel alloy tubing and incorporates an internal shoulder 212 at the base which serves as a seat for a spring retainer 214, which is secured to the signal pressure diaphragm 151. A spring 215 engages the upper end of the spring retainer 214, the upper end of said spring being received on a spring retaining portion 216 of a manual adjusting rod 217. The rod 217 is secured to the upper end of the thermostat differential screw by any suitable means and is shown as being threadably received in a threaded opening provided therefor in said upper end of said differential screw.

The differential screw sleeve 187 is provided with drilled holes 220 and the thermostat rod 194 is also provided with holes 221 therethrough. A passage 223, having a restricted orifice 224 therein, is connected to a conduit 225. Air from the cabin enters the conduit 225 and flows through the passage 224 into the space 226 between the differential screw sleeve 187 and the wall of the bore 188. This air may also flow through the openings 220 in said sleeve 187 and thence through the openings 221 in the rod 194, said air also being adapted to enter the space 228 between said rod 194 and sleeve 187 and also the space 230 between said rod 194 and the core 210. It is to be noted that the sleeve 187 and rod 194 have additional openings 231 and 232, respectively, in longitudinally spaced relation to the openings or holes 220 and 221. It is to be noted that there is a branch passage 233 from the passage 112a to said space 226 between the wall of the bore 188 and the exterior of the sleeve 187.

The spring retainer 214 has an axial bore 235 which is closed at its upper end but which communicates with the signal pressure chamber 153 below the diaphragm 151. Cross bores 236 connect the bore 235 with the ambient pressure chamber 152 above the diaphragm 151 and communication between chambers 153 and 152 is controlled by a ball valve 237 brazed or otherwise suitably secured to a retainer 238 extending upwardly from the bottom wall 239 of the chamber 153. Since the retainer 214, which is carried by diaphragm 151, is urged toward ball valve 237 by spring 215, communication between chamber 153 and bore 235 will be precluded until the retainer 214 is moved away from valve 237, either by an application of pressure on the underside of diaphragm 151 sufficient to overcome the force of spring 215, or by upward movement of core 210 through the elongation of thermostat rod 194, which movement is transmitted to retainer 214 by shoulder 212 on core 210. When knob 180 is adjusted in a direction which causes thermostat rod 194 to move toward ball valve 237 a distance sufficient to space shoulder 212 from the retainer 214, the rod 217 will also be moved but in a direction away from ball valve 237, reducing the force of spring 215 which urges retainer 214 toward a valve closing position. After shoulder 212 is spaced from retainer 214, the controller is manually adjusted by changing the force of spring 215 through the manipulation of knob 180.

*Operation of the system*

The ram air valve 26 of the ram air mechanism 25 is pneumatically connected to the shut-off valve mechanism 44 by conduit 116 and a portion of conduit 112. When the valve 40 of the latter mechanism is open the ram air valve is closed, and vice versa. The mechanism 25 is also connected to the bypass valve mechanism 60 and to the temperature controller 115. As the device 25 is spring loaded to open the valve, said valve will open by dumping of the pressure in the chamber 36 through the controller 115 when the latter is in the Ram Air and Dump position.

The bleed air shut-off valve device 44 is connected to the controller 115. As the device 44 is spring loaded closed, it will close when the pressure is dumped from chamber 54 thereof through the controller when the latter is in the Ram Air and Dump position, at which time all actuating air entering the main actuator system is through the restricted orifice 111. Upon closing of the dump valve 176 in the controller 115, the pressure in the actuating system will build up and cause a build up of pressure in the diaphragm actuator chamber 54, causing the diaphragm 47 to open the valve 40.

The bypass valve 61 is located in the bleed air duct 21 which bypasses the heat exchanger and cooling turbine, the function of this valve being to control the flow of air through the bypass passage 21 and, when said valve 61 is open, to allow hot bypass air to mix with cold turbine discharge air thereby effecting modulation of the temperature of the air entering the cabin. The bypass valve mechanism 60 receives actuating pressure from conduit 11 by way of the conduit 105, and passages 106, 120 and 123. The unit is under control of the rate of change controlling device of 122a and the high limit thermostat device 142. The spring loaded diaphragm 97 positions the metering valve 84 which is connected through spring 87 to the diaphragm 66. One side of the diaphragm 97 is exposed to ambient pressure through opening 99 and the other side is exposed to pressure from the remotely located temperature controller 115 in the system, and to supply pressure through conduit 105, passage 106 and orifice 107. Actuator pressure is applied to one side of the actuator diaphragm 66, the opposite side of which is exposed to ambient pressure through the opening 72.

The controller 115, by either thermostatic (automatic) or manual control varies the pressure to the chamber 96 and hence on the diaphragm 97. With increasing pressure in the chamber 96 diaphragm 97 moves the valve 84 in the opening direction. As said valve 84 opens, pressure in the chamber 75 increases so that the diaphragm 66 moves downwardly to compress the return spring 76 and extend the tension spring 87 attached to the controlling diaphragm 97. In this way, for a given pressure applied from the controller, the controlling diaphragm 97 will power the main actuating diaphragm 66 to a position wherein the tension spring 87 will counteract the power pressure allowing the metering valve 84 to throttle. This type of system allows for a combination of manual and temperature control. It also allows for accurate positioning of the bypass valve 61 on manual control regardless of inlet pressure conditions.

Connected to the power circuit between the actuator for the valve 61 and the metering valve 84 is the high limit thermostat 142. This device serves as a temperature limiting pickup to override the temperature controller 115 and modulate the bypass valve 61 so as to limit the cabin inlet mixed air temperature to a predetermined value, as, for example, a nominal value of 300° F. The thermostatic device 142 operates on the principle of the difference in expansion or contraction between the high co-efficient of expansion housing 144 and the low co-efficient of expansion core 143 during temperature changes and bleeds pressure from the opening 140 of chamber 129 to ambient air when the temperature exceeds the calibrated value. Chamber 129 receives pressure from chamber 130 by way of bleed opening 134 and said chamber 130 receives pressure by way of conduit 121.

The air pressure rate of change device 122 includes the diaphragm 128 which carries the ball valve 136 controlling the outlet 135 of chamber 130. This device provides means for limiting the rate of temperature change at which the temperature control device 122 controls the bypass valve mechanism.

In operation, as the temperature of the air being controlled approaches the high limit setting, the valve 141 is opened by the thermostat, thus creating a drop in the pressure in the chamber 129 so that diaphragm 128 moves downwardly to open the valve 136. Air will then be bled from the chamber 75 of the device 60 causing the diaphragm 66 thereof to move upwardly under the influence of spring 76 and thereby move the valve 61 in the closing direction to reduce the amount of hot air bypassing the intercooler and cooling turbine.

The controller 115, which is located in the aircraft cabin senses cabin temperature through the conduit 225 and passage 223. As the controller is connected through the dump passage 112a to the actuator pressure chamber 36 of the ram air valve mechanism 25, the chamber 54 of the bleed air shut-off valve mechanism 44 and the bypass passage 117a is connected to the pressure chamber 96 of the thermostat controlled hot air bypass valve mechanism 60, and the vent passage 157a is connected to atmosphere, the controller 115 sequences these mechanisms to provide cabin air conditioning and temperature control in accordance with the settings on the controller dial.

During operation of the system the temperature setting of the controller 115 is selected by turning the control knob 180 to one of the index positions, that is, Ram Air and Dump—Automatic Cold—Automatic Hot—Manual Hot—Manual Cold. The manual adjusting rod 217, being fixed to the differential screw 187, turns and moves longitudinally with the screw because of the outer thread of the screw, reacting with the thread in the body 50. The thermostat rod 194 however, being restrained against turning movement, tends to move longitudinally due to the reaction of the threads thereon with the inner thread of the screw. Since the pitch of the threads 195 in screw 187 and on rod 194 is steeper than that on the exterior of the screw 187, the rod 194 and core 210 will move longitudinally relative to the body 150. This results in a differential location of the rod 217 relative to the core and provides means for varying the spring loading of the signal pressure diaphragm 151.

During manual operation of the controller the signal pressure diaphragm 151 acts as a pressure regulator against the spring load, by spring 215, established by the manual adjusting rod 217. Signal pressure is varied by changing the loading of spring 215, and is thus manually controlled to maintain relay pressure in the relay chamber 156 at the value required for proper positioning of the hot air bypass valve 61, the operation of the hot air bypass valve mechanism being hereinabove described.

During automatic operation of the controller, signal pressure in the chamber 153, and hence in the chamber 155, is varied by the action of the expansion and contraction of the rod and the core. Temperature changes in cabin air, sensed by the thermostat which operates on the principle of differential expansion or contraction between the rod and the core, effects modulation of the position of the signal pressure diaphragm 151 to allow signal pressure air to vent to atmosphere through passages 112a, 157a and the conduit 157, and enables the amplifier diaphragm 154 to maintain relay pressure in chamber 156 at the value required for proper control of the hot air bypass valve 61 by the thermostat control air shut-off valve mechanism 60.

When Ram Air and Dump is selected, the dump valve 176 is opened to connect passage 112a to atmosphere by way of passage 157a and conduit 157. This has the effect of dumping pressure from the bleed shut-off valve mechanism 44 and from the ram air shut-off valve mechanism 25. The result is: that the shut-off valve 40 closes and the ram air shut-off valve 26 opens.

As increases in altitude result in corresponding decreases in ambient atmospheric temperature there is a faster loss of heat from the cabin of an aircraft as they ascend and it is desirable to compensate for these factors. The present mechanism automatically takes care of this situation through the pressure ratio increase with altitude. That is, the temperature setting also increases so that as the aircraft ascends the temperature of the air supplied to the cabin is automatically increased.

I claim:

1. In a controller for an air conditioning and temperature control system for an enclosure: a housing with a cylindrical cavity having an outer end portion tapering outwardly to provide a frusto-conical recess; a frusto-conical dump valve in said recess, said dump valve having an internally serrated axial bore at the inner end thereof; a differential screw comprising a tubular sleeve operably received in said cavity, said sleeve being of smaller diameter than the diameter of said cavity, said sleeve having a splined outer end portion operably disposed in the serrated bore of the dump valve whereby said sleeve will rotate with rotatable movement of said dump valve but will be axially slidable relative thereto, the inner end of said sleeve having internal and external screw threads, the external screw threads being engageable with screw threads provided therefor in said housing adjacent the inner end of said cavity; a thermostat rod comprising a tubular sleeve operably disposed within said differential screw, said thermostat rod having external threads adjacent the inner end thereof engageable with the internal threads of the differential screw; means restraining said rod against rotative movement but permitting longitudinal movement thereof with respect to said screw; a pressure responsive member adjacent the inner end of the thermostat rod; means, including said pressure responsive member, defining a pair of pressure chambers on opposite sides of said pressure responsive member, the outermost of said chambers being a signal pressure chamber and the other of said chambers being an ambient pressure chamber; a tubular core operably disposed within the thermostat rod; an internal shoulder adjacent the inner end of said core; a spring retainer having a portion engageable with said shoulder, said spring retainer being secured to said pressure responsive member; an adjusting rod secured to the differential screw adjacent the outer end thereof and extending axially within the core, the inner end of said adjusting rod being spaced axially from said spring retainer; a spring between the inner end of said adjusting rod and said retainer; passage means through said spring retainer providing communication between the ambient pressure chamber and the signal pressure chamber, said passage means including a port at the signal pressure chamber side of said pressure responsive member; a valve member for controlling said port; yielding means urging the thermostat rod outwardly; passage means for receiving air from the enclosure and conducting same to the thermostatic differential screw, thermostat rod and core; amplifier means including a pressure responsive element; means defining a pair of chambers on opposite sides of said amplifier pressure responsive element, one of said chambers being a relay pressure chamber and the other of said chambers being a signal pressure chamber; bleed means interconnecting said signal pressure chamber and said relay pressure chamber of the amplifier means; passage means connecting the signal pressure chambers together; second passage means connecting the ambient pressure chamber with said dump valve, with the housing opening and interior of the differential screw and thermostat rod, with an atmospheric vent passage, and with control devices for said system; passage means, including a port, connecting the relay pressure chamber with the vent passage and with the second passage means; valve means carried by the pressure responsive element of the amplifier for controlling last named port; spring means urging said pressure responsive element in a direction to move said valve means in the valve closing direction; and bypass passage means connecting the relay pressure chamber with control mechanisms of said system; said controller having ram air and dump, automatic cold, automatic hot, manual hot and manual cold positions, selectable by adjustment of said dump valve.

2. In a controller for an air conditioning and temperature control system: a cylindrical thermostat receptacle having an outer end portion; a dump valve in said outer end portion, said dump valve having an internally serrated axial bore at the inner end thereof; a differential screw comprising a tubular sleeve operably received in said receptacle, said sleeve being of smaller diameter than the diameter of said receptacle, said sleeve having a splined outer end portion operably disposed in the serrated bore of the dump valve whereby said sleeve will rotate with rotatable movement of said dump valve but will be axially slidable relative thereto, the inner end of said sleeve having internal and external screw threads, the external screw threads being engageable with screw threads provided therefor in said receptacle adjacent the inner end of said receptacle; a thermostat rod comprising a tubular sleeve operably disposed within said differential screw, said thermostat rod having external threads adjacent the inner end thereof engageable with the internal threads of the differential screw; means restraining said rod against rotative movement but permitting longitudinal movement thereof with respect to said screw; a pressure responsive member; means, including said pressure responsive member, defining a pair of pressure chambers on opposite sides of said pressure responsive member, the outermost of said chambers being a signal pressure chamber and the other of said chambers being an ambient pressure chamber; a tubular core operably disposed within the thermostat rod; an internal shoulder adjacent the inner end of said core; a spring retainer having a portion engageable with said shoulder, said spring retainer being secured to said pressure responsive member; an adjusting rod secured to the differential screw adjacent the outer end thereof and extending axially within the core, the inner end of said adjusting rod being spaced axially from said spring retainer; a spring between the inner end of said adjusting rod and said retainer; passage means through said spring retainer providing communication between the ambient pressure chamber and the signal pressure chamber, said passage means including a port at the signal pressure chamber side of said pressure responsive member; a valve member for controlling said port; yielding means urging the thermostat rod outwardly; passage means for receiving air from the enclosure and conducting same to the thermostatic differential screw, thermostat rod and core; pneumatic amplifier means adapted to be connected with control devices of said system; passage means connecting the signal pressure chamber with said amplifier means; second passage means connecting the ambient pressure chamber with said dump valve, with the receptacle and interior of the differential screw and thermostat rod, with an atmospheric vent passage, passage means, including a port, connecting the amplifier means with the vent passage and with the second passage means; said controller having ram air and dump, automatic cold, automatic hot, manual hot and manual cold positions, selectable by adjustment of said dump valve.

3. In a controller for an air conditioning system for enclosures: a housing with a receptacle having a cylindrical cavity with an outer end portion; a dump valve in said outer end portion, said dump valve having an internally serrated axial bore at the inner end thereof; a differential screw comprising a tubular sleeve operably received in said cavity, said sleeve being of smaller diameter than the diameter of said cavity, said sleeve having a splined outer end portion operably disposed in the serrated bore of the dump valve whereby said sleeve will rotate with rotatable movement of said dump valve but will be axially slidable relative thereto, the inner end of said sleeve having internal and external screw threads, the external screw threads being engageable with screw threads provided therefor in said housing adjacent the inner end of said cavity; a thermostat rod comprising a tubular sleeve operably disposed within said differential screw, said thermostat rod having external threads adjacent the inner end thereof engageable with the internal threads of the differential screw; means restraining said rod against rotative movement but permitting longitudinal movement thereof with respect to said screw; a pressure responsive member; means, including said pressure responsive member, defining a pair of pressure chambers on opposite sides of said pressure responsive member; a tubular core operably disposed within the thermostat rod; an internal shoulder adjacent the inner end of said core; a spring retainer having a portion engageable with said shoulder, said spring retainer being secured to said pressure responsive member; an adjusting rod secured to the differential screw adjacent the outer end thereof and extending axially within the core, the inner end of said adjusting rod being spaced axially from said spring retainer; a spring between the inner end of said adjusting rod and said retainer; passage means through said spring retainer providing communication between said chambers including a port; a valve member for controlling said port; yielding means urging the thermostat rod outwardly; passage means for receiving air from the enclosure and conducting same to the thermostatic differential screw, thermostat rod and core; and passage means connecting one of said chambers with said dump valve, with the cylindrical cavity and interior of the differential screw and thermostat rod, and with an atmospheric vent, said dump valve controlling the vent connection.

4. In a controller for an air conditioning system for enclosures: a housing with a cylindrical receptacle having an outer end portion tapering outwardly to provide a frusto-conical recess; a dump valve in said recess, said dump valve having an internally serrated axial bore at the inner end thereof; a differential screw comprising a tubular sleeve operably received in said receptacle, said sleeve being of smaller diameter than the diameter of said receptacle, said sleeve having a splined outer end portion operably disposed in the serrated bore of the dump valve whereby said sleeve will rotate with rotatable movement of said dump valve but will be axially slidable relative thereto, the inner end of said sleeve having internal and external screw threads, the external screw threads being engageable with screw threads provided therefor in said housing adjacent the inner end of said receptacle; a thermostat rod comprising a tubular sleeve operably disposed within said differential screw, said thermostat rod having external threads adjacent the inner end thereof engageable with the internal threads of the differential screw; means restraining said rod against rotative movement but permitting longitudinal movement thereof with respect to said screw; a pressure responsive member; means, including said pressure responsive member, defining a pair of pressure chambers on opposite sides of said pressure responsive member, the outermost of said chambers being a signal pressure chamber and the other of said chambers being an ambient pressure chamber; a tubular core operably disposed within the thermostat rod; an internal shoulder adjacent the inner end of said core; a spring retainer having a portion engageable with said shoulder, said spring retainer being secured to said pressure responsive member; an adjusting rod secured to the differential screw adjacent the outer end thereof and extending axially within the core, the inner end of said adjusting rod being spaced axially from said spring retainer; a spring between the inner end of said adjusting rod and said retainer; passage means through said spring retainer providing communication between the ambient pressure chamber and the signal pressure chamber, said passage means including a port at the signal pressure chamber side of said pressure responsive member; a valve member for controlling said port; yielding means urging the thermostat rod outwardly; passage means for receiving air from the enclosure and conducting same to the thermostatic differential screw, thermostat rod and core; amplifier means including a pressure responsive element; means defining a pair of chambers on opposite sides of said amplifier pressure responsive element, one of said chambers being a relay pressure chamber and the other of said chambers being a signal pressure chamber; bleed means interconnecting said signal pressure chamber and said relay pressure chamber of the amplifier means; passage means connecting the signal pressure chambers together; second passage means connecting the ambient pressure chamber with said dump valve, with the housing opening and interior of the differential screw and thermostat rod, with an atmospheric vent passage, and with a hot air control means and the cold air bypass control means; passage means, including a port, connecting the relay pressure chamber with the vent passage and with the second passage means; valve means carried by the pressure responsive element of the amplifier for controlling last named port; spring means urging said pressure responsive element in a direction to move said valve means in the valve closing direction; and bypass passage means connecting the relay pressure chamber with the pressure responsive regulating means; said controller having ram air and dump, automatic cold, automatic hot, manual hot and manual cold positions, selectable by adjustment of said dump valve.

5. In a controller for air conditioning systems: casing having a cylindrical cavity with an outer end portion tapering outwardly to provide a frusto-conical recess; a frusto-conical dump valve in said recess, said dump valve having an internally serrated axial bore at the inner end thereof; a differential screw comprising a tubular sleeve operably received in said cavity, said sleeve being of smaller diameter than the diameter of said cavity, said sleeve having a splined outer end portion operably disposed in the serrated bore of the dump valve whereby said sleeve will rotate with rotatable movement of said dump valve but will be axially slidable relative thereto, the inner end of said sleeve having internal and external screw threads, the external screw threads being engageable with screw threads provided therefor in said casing adjacent the inner end of said cavity; a thermostat rod comprising a tubular sleeve operably disposed within said differential screw in spaced relation thereto throughout a major portion of its length, said thermostat rod having external threads adjacent the inner end thereof engageable with the internal threads of the differential screw; means restraining said rod against rotative movement but permitting longitudinal movement thereof with respect to said screw; pressure responsive means; a tubular core operably disposed within the thermostat rod; an internal shoulder adjacent the inner end of said core; a spring retainer having a portion engageable with said shoulder, said spring retainer being operably connected with said pressure responsive means; an adjusting rod secured to the differential screw adjacent the outer end thereof and extending axially within the core, the inner end of said adjusting rod being spaced axially from said spring retainer; and a spring between the inner end of said adjusting rod and said retainer.

6. In a controller: a casing defining a cylindrical cavity having an outer end portion tapering outwardly to provide a frusto-conical recess; a frusto-conical dump valve in said recess, said dump valve having an internally serrated axial bore at the inner end thereof; a differential screw comprising a tubular sleeve operably received in said cavity, said sleeve being of smaller diameter than the diameter of said cavity, said sleeve having a splined outer end portion operably disposed in the serrated bore of the dump valve whereby said sleeve will rotate with rotatable movement of said dump valve but will be axially slidable relative thereto, the inner end of said sleeve having internal and external screw threads, the external screw threads being engageable with screw threads provided therefor in said casing adjacent the inner end of said cavity; a thermostat rod comprising a tubular sleeve operably disposed within said differential screw, said thermostat rod having external threads adjacent the inner end thereof engageable with the internal threads of the differential screw; means restraining said rod against rotative movement but permitting longitudinal movement thereof with respect to said screw; a tubular core operably disposed within the thermostat rod; an internal shoulder adjacent the inner end of said core; a spring retainer having a portion engageable with said shoulder; an adjusting rod secured to the differential screw adjacent the outer end thereof and extending axially within the core, the inner end of said adjusting rod being spaced axially from said spring retainer; and a spring between the inner end of said adjusting rod and said retainer.

7. In a controller: means defining a cylindrical cavity; a tubular differential screw operably mounted in said cavity, said screw having internal and external threads, the external threads being engageable with threads provided therefor in said cavity; a tubular thermostat rod operably disposed within said differential screw, said rod having external threads engageable with the internal threads of the differential screw, said rod being longitudinally movable relative to the differential screw but restrained against rotative movement; a tubular core operably disposed within the tubular rod; an adjusting rod secured to the differential screw; and a dump valve having a movable member secured to said differential screw.

8. In a controller: amplifier means, including a pressure responsive element; means defining a first signal pressure chamber on one side of said element and a relay pressure chamber on the opposite side thereof, said relay pressure chamber being connected to ambient atmosphere, said connection being controlled by said element; pressure responsive means, including a pressure responsive member; means defining a second signal pressure chamber on one side of said member and an ambient pressure chamber on the opposite side thereof; means interconnecting said second signal pressure chamber and ambient pressure chamber, said pressure responsive member controlling the last named interconnection; means interconnecting the signal pressure chambers; and temperature responsive means and manually actuated means constructed and arranged to control the response characteristics of said pressure responsive member, and hence the connection between the second signal pressure chamber and atmosphere.

9. In a controller: means defining a chamber; a tubular differential screw operably mounted in said chamber, said screw having internal and external threads, the external threads being engageable with threads provided therefor in said chamber; a tubular thermostat rod operably disposed within said differential screw, said rod having external threads engageable with the internal threads of the differential screw, said rod being longitudinally movable relative to the differential screw but restrained against rotative movement; a tubular core operably disposed within the tubular rod; an adjusting rod secured to the differential screw; and a dump valve having a movable member secured to said differential screw.

10. In a controller: amplifier means, including a pressure responsive element; means defining a first signal pressure chamber at one side of said element and a relay pressure chamber at the opposite side thereof, having the entire area of said opposite side subjected at all times to the pressure in said relay pressure chamber, said relay pressure chamber being connected to ambient atmosphere, said connection being controlled by said element; pressure responsive means including a pressure responsive member; means defining a second signal pressure chamber on one side of said member and an ambient pressure chamber on the opposite side thereof; means interconnecting said second signal pressure chamber and ambient atmospheric pressure chamber, said pressure responsive member controlling the last named interconnection; means interconnecting the signal pressure chambers; and temperature responsive means and manually actuated means constructed and arranged to control the response characteristics of said pressure responsive member.

11. In a controller: amplifier means, including a pressure responsive element; means defining a first signal pressure chamber on one side of said element and a relay pressure chamber on the opposite side thereof, said relay pressure chamber being adapted to be connected to a pneumatically actuated device and being connected to ambient atmosphere, said connection being controlled by said element; pressure responsive means, including a pressure responsive member; means defining a second signal pressure chamber on one side of said member and an ambient pressure chamber on the opposite side thereof; means interconnecting said second signal pressure chamber and ambient pressure chamber, said pressure responsive means controlling said interconnection; means interconnecting the signal pressure chambers; and temperature responsive means and manually actuated means constructed and arranged to control the response characteristics of said pressure responsive member.

References Cited in the file of this patent

UNITED STATES PATENTS

| | | |
|---|---|---|
| 1,312,253 | Johnson | Aug. 5, 1919 |
| 2,061,915 | Mautsch | Nov. 24, 1936 |
| 2,166,077 | Spitzglass | July 11, 1939 |
| 2,202,485 | Fitch | May 28, 1940 |
| 2,412,071 | Warner et al. | Dec. 3, 1946 |
| 2,451,280 | Del Mar | Oct. 12, 1948 |
| 2,620,983 | Lyman | Dec. 9, 1952 |
| 2,638,922 | Caldwell | May 19, 1953 |
| 2,659,381 | Seljos | Nov. 17, 1953 |
| 2,678,542 | Stanton | May 18, 1954 |